United States Patent
Salmon et al.

(10) Patent No.: US 8,140,264 B2
(45) Date of Patent: Mar. 20, 2012

(54) ADVANCED TERRAIN ANTI-COLLISION DEVICE

(75) Inventors: Philippe Salmon, Colombiers (FR); Hugues Meunier, Frouzins (FR)

(73) Assignee: Thales (FR)

( * ) Notice: Subject to any disclaimer, the term of this patent is extended or adjusted under 35 U.S.C. 154(b) by 1260 days.

(21) Appl. No.: 10/583,359

(22) PCT Filed: Dec. 8, 2004

(86) PCT No.: PCT/EP2004/053325
§ 371 (c)(1),
(2), (4) Date: Jun. 19, 2006

(87) PCT Pub. No.: WO2005/069093
PCT Pub. Date: Jul. 28, 2005

(65) Prior Publication Data
US 2007/0185652 A1  Aug. 9, 2007

(30) Foreign Application Priority Data
Dec. 19, 2003 (FR) .................................... 03 15022

(51) Int. Cl.
*G08G 1/16* (2006.01)
(52) U.S. Cl. .................... 701/301; 701/3; 701/4; 701/9; 701/10; 701/14
(58) Field of Classification Search .............. 701/3, 9, 701/10, 301, 4, 14; 342/455; 340/963, 967
See application file for complete search history.

(56) References Cited

U.S. PATENT DOCUMENTS

| | | | | |
|---|---|---|---|---|
| 4,354,237 A | * | 10/1982 | Lambregts et al. | 701/16 |
| 4,567,483 A | * | 1/1986 | Bateman et al. | 340/970 |
| 4,684,948 A | * | 8/1987 | Bateman | 340/970 |
| 4,914,436 A | * | 4/1990 | Bateman et al. | 340/970 |
| 5,414,631 A | * | 5/1995 | Denoize et al. | 701/301 |
| 5,442,556 A | * | 8/1995 | Boyes et al. | 701/9 |
| 5,488,563 A | * | 1/1996 | Chazelle et al. | 701/301 |
| 5,677,842 A | * | 10/1997 | Denoize et al. | 701/301 |
| 5,884,222 A | * | 3/1999 | Denoize et al. | 701/301 |
| 5,892,462 A | * | 4/1999 | Tran | 340/961 |
| 6,088,654 A | * | 7/2000 | Lepere et al. | 701/301 |
| 6,317,663 B1 | | 11/2001 | Meunier et al. | |
| 6,370,475 B1 | * | 4/2002 | Breed et al. | 701/301 |
| 6,405,132 B1 | * | 6/2002 | Breed et al. | 701/301 |
| 6,433,729 B1 | * | 8/2002 | Staggs | 342/29 |
| 6,480,120 B1 | * | 11/2002 | Meunier | 340/970 |
| 6,484,072 B1 | * | 11/2002 | Anderson et al. | 701/9 |
| 6,525,674 B1 | * | 2/2003 | Kelly et al. | 340/970 |

(Continued)

*Primary Examiner* — Khoi Tran
*Assistant Examiner* — Jorge Peche
(74) *Attorney, Agent, or Firm* — Lowe Hauptman Ham & Berner, LLP

(57) ABSTRACT

The field of the invention is that of onboard terrain anticollision systems for aircraft. Collisions with the terrain while the aircraft is fully controlled have been and still remain one of the main causes of air disasters. Several generations of devices for warning of risk of collision with the terrain have been developed for some thirty years now. The most advanced of these systems comprise means of alarm differing according to the maneuver to be performed by the pilot. It is of course vital that the recommended maneuver best guarantee the safety of the aircraft. The device according to the invention proposes a device comprising the calculation of several different safety surfaces or profiles. Their comparisons with the topographic data of the surrounding terrain make it possible to deduce therefrom the best alarm and the best maneuver to be performed to avoid the collision between the aircraft and the ground.

18 Claims, 8 Drawing Sheets

U.S. PATENT DOCUMENTS

| | | | |
|---|---|---|---|
| 6,546,338 B2 * | 4/2003 | Sainthuile et al. | 701/301 |
| 6,583,733 B2 * | 6/2003 | Ishihara et al. | 340/946 |
| 6,606,034 B1 * | 8/2003 | Muller et al. | 340/970 |
| 6,906,641 B2 * | 6/2005 | Ishihara | 340/946 |
| 7,173,545 B2 * | 2/2007 | Berthe | 340/961 |
| 7,321,813 B2 * | 1/2008 | Meunier | 701/10 |
| 7,386,373 B1 * | 6/2008 | Chen et al. | 701/9 |
| 2003/0107499 A1 * | 6/2003 | Lepere et al. | 340/945 |
| 2004/0181318 A1 * | 9/2004 | Redmond et al. | 701/9 |
| 2006/0052912 A1 * | 3/2006 | Meunier | 701/10 |
| 2006/0074559 A1 * | 4/2006 | Meunier | 701/301 |
| 2006/0097895 A1 * | 5/2006 | Reynolds et al. | 340/961 |

* cited by examiner

ADVANCED TERRAIN ANTI-COLLISION DEVICE

CROSS-REFERENCE TO RELATED APPLICATIONS

The present Application is based on International Application No. PCT/EP2004/053325, filed on Dec. 8, 2004, which in turn corresponds to FR 03/15022 filed on Dec. 19, 2003, and priority is hereby claimed under 35 USC §119 based on these applications. Each of these applications are hereby incorporated by reference in their entirety into the present application.

BACKGROUND OF THE INVENTION

1. Field of the Invention

The field of the invention is that of onboard terrain anticollision systems for aircraft.

2. Description of the Prior Art

Collisions with the terrain while the aircraft is fully controlled also called "CFIT", the acronym standing for "Controlled Flight Into Terrain", have been and still remain one of the main causes of air disasters. Developed some thirty years ago, the systems termed "GPWS", the acronym standing for "Ground Proximity Warning System", have allowed a significant reduction in the number of accidents. They are based on the use of radio-probes which make it possible to determine in an instantaneous manner the position of the aircraft with respect to the ground. These rudimentary and nonpredictive systems have not however made it possible to completely eliminate accidents of this type.

More recently, "GCAS" type systems, the acronym standing for "Ground Avoidance Collision System", have appeared. These systems rely on the use of systems for predicting potential trajectories of the craft and the determination of possible collisions between these trajectories and the terrain. The pilot can thus anticipate a future collision and react accordingly.

More recently still, terrain anticollision systems have taken the generic term of "TAWS", the acronym standing for "Terrain Awareness Warning System", and cover all systems possessing a function for predicting potential collisions with the terrain. These systems are defined by an international aeronautical standard, the TSO C151A, and fulfill in addition to the customary GPWS functions, the additional functions of predictive alert of risks of collision with the relief and/or obstacles on the ground termed "FLTA", the acronym standing for "predictive Forward-Looking Terrain collision Awareness and alerting" and of premature descent termed "PDA", the acronym standing for <<Premature Descent Alerting". These FLTA and PDA functions consist in warning the crew through timely prealerts or alerts whenever, under controlled flight, a situation of risk of collision with the terrain arises, in particular when the short-term foreseeable trajectory of the aircraft encounters the relief and/or an obstacle on the ground, so that an avoidance maneuver is engaged. The pilot can thus avoid the "CFIT" by an appropriate avoidance maneuver. The basic maneuver is termed "pull-up" signifying vertical avoidance.

These functions can according to the implementation be grouped into a single mode termed "CPA", the acronym standing for "Collision Prediction and Alerting".

The first generation of "TAWS" systems affords the functions of prediction of potential trajectories, of determination of risk of collision with the terrain, of cartographic display of the terrain comprising the indication of the risk of collision and of audible alerts in the event of risk of collision. Certain second-generation systems of the "TAWS" systems allow not only the prediction of the risk of collision with the terrain, but also alert the pilot as to the feasibility of the disengagement maneuver to be performed to anticipate this risk of collision. This is rendered possible by the use in real time of the upward speed capabilities of the aircraft.

In a more precise manner, the "CPA" mode is based on a comparison between a surface also called the safety profile denoted S or "clearance sensor" and the surface or the terrain profile situated under said surface or said safety profile, said comparison taking account of a safety margin. The terrain profile arises from a topographic representation extracted from a terrain and/or obstacles database onboard the aircraft and is correlated with the position of the aircraft by virtue of the position sensors of the aircraft.

The safety surface or profile S are represented diagrammatically in the two cross sections of FIG. 1 which represent a lateral view and a view from above of said surface or of said profile.

The intersection of said surface S with a vertical plane containing the aircraft A forms a trajectory termed the predicted trajectory $T_P$. In FIG. 1, the origin O of this predicted trajectory is taken under the aircraft, vertical thereto and with a vertical safety margin MV whose value is determined as a function of various parameters such as, for example, the flight phase, the vertical speed of the aircraft, the distance to the closest airport or destination airport. In a first variant of calculation of the "clearance sensor", the safety margin is in an equivalent manner associated with the profile or with the terrain surface. In this case, the origin O of the trajectory is taken at the level of the aircraft, the origin of the terrain under the aircraft this time being heightened by a vertical safety margin MV. It is possible, of course, to combine in a second variant, the two modes of calculation of the "clearance sensor", that is to say take the origin O of the trajectory under the aircraft with a first margin and "raise up" the terrain by a second margin, the sum of these two margins being equal to the safety margin MV.

This origin O determined, the predicted trajectory $T_P$ comprises two main parts as is indicated in the lateral view of FIG. 1 where the predicted trajectory appears in solid line:

a first part corresponding to a first flight time $T_1$, dependent on a prediction of the trajectory in progress calculated on the basis of the origin O;

a second part corresponding to a second flight time $T_2$ following the first flight time $T_1$, dependent on a prediction of a vertical avoidance trajectory. The first part is calculated on the basis of flight parameters comprising the speed and the roll angles of the aircraft.

Generally, the flight time $T_1$ is at least equal to the response time necessary for initializing a vertical avoidance maneuver.

The second part is also called "SVRMB", the acronym standing for "Standard Vertical Recovery Maneuver Boundary". It models a lower limit of the standard vertical avoidance trajectory supposed to make it possible to avoid the collision with the terrain. The maneuver comprises, for the pilot, the following successive operations:

Reducing the roll angle until horizontal stabilization of the aircraft. By way of example, the rate is 15 degrees per second;

Pulling up the aircraft under a load factor compatible with the performance of the aircraft. By way of example, the load factor is 0.5 g;

Maintaining the pull-up angle of the aircraft either with a standard slope equal to a certain percentage of the possible maximum slope of the aircraft, for example equal to 90 percent, or with a slope equal to the slope of the aircraft when it is already greater than said standard slope. The typical duration $T_2$ of this phase is of the order of 112 seconds. This duration can be modulated as a function of the proximity of the airport for certain mountainous zones or for other flight considerations.

The future trajectory $T_F$ of the aircraft in the event of a vertical avoidance maneuver is depicted dashed in the lateral view of this figure.

The safety surface or profile are limited laterally by a left limit $T_G$ and a right limit $T_D$ as is seen in the view from above of FIG. 1 where these limits are depicted in solid line. These limits correspond to predicted limit trajectories of the aircraft during a flight duration corresponding to the sum of the first and second flight times $T_1$ and $T_2$, said limits being defined essentially by a lateral margin ML taking its origin at the point O and at least one angle of left lateral aperture $\theta_G$ and at least one angle of right lateral aperture $\theta_D$, left and right being defined with respect to the sense of the trajectory of the aircraft.

The limits of the terrain situated under the aircraft used for the comparison with the safety surface or profile are obtained by the vertical projection of the left and right limits of the safety surface onto the terrain situated under the aircraft.

The lateral margin ML taken in a horizontal plane passing through the origin O typically equals 100 meters on either side of the aircraft. The aperture angles can vary as a function of the forecast curvature of the future trajectory of the craft in a horizontal plane. Said trajectory is represented dashed in FIG. 1. On the convex side of the curvature, the angle of lateral aperture typically equals a few degrees. It is limited to a value of 90 degrees. On the opposite side, it typically equals 1.5 degrees. In FIG. 1, the aircraft is turning to the right. Consequently, the angle of right lateral aperture $\theta_D$ equals several degrees and the angle of left lateral aperture $\theta_G$ equals 1.5 degrees. In this way, the surface situated between these two limits covers the whole zone capable of being overflown by the aircraft during a flight duration equal to the sum of the first flight time $T_1$ and of the second flight time $T_2$.

Currently, the "CPA" mode calculates two safety surfaces or profiles, the first surface $S_{MT}$ is called the medium-term safety Surface or Profile or else the "Medium Term Clearance Sensor" and the second $S_{CT}$ is called the short-term safety Surface or Profile or else the "Short Term Clearance Sensor". These surfaces are represented in FIG. 2.

The short-term safety surface or profile are calculated as indicated in the previous paragraphs.

The medium-term safety surface or profile comprise two parts. The first part can be determined in a similar way to the first part of the safety surface or of the short-term profile. The second part corresponds to a second surface or a second safety profile that can be built according to calculation principles similar to those of the short-term safety surface or profile but by taking the origin O' of said second surface no longer at the level of the aircraft A but on the predicted trajectory ahead of the aircraft. Typically, the first flight time $T_1$ of the predicted trajectory of the medium-term safety surface or profile has a duration of about 20, the first flight time of the predicted trajectory of the short-term safety surface or profile has a duration of about 8 seconds. These values of 20 and of 8 seconds can be modulated as a function of considerations such as the height of the aircraft above the ground, the airspeed of the aircraft, its vertical speed, the proximity of an airport, etc.

The medium-term safety surface or profile $S_{MT}$ is dedicated, in conjunction with the surface or the profile of the terrain, corresponding to the advanced detection of risk of collision with the terrain G as indicated in FIG. 3. The risk of collision is depicted by a white star. In the event of risk of collision, a prealarm is emitted in audible and/or visual form. In this case, the potentially dangerous terrain is depicted typically in plain yellow on the displays of the instrument panel. The pilot can then evaluate the situation and rectify or otherwise his current trajectory.

The short-term safety surface or profile $S_{CT}$ is dedicated, in conjunction with the surface or the profile of the corresponding terrain, to the detection of risk of imminent collision with the terrain G as indicated in FIG. 4. In the event of risk of collision, an alarm is emitted in audible and/or visual form. This alarm is in the general case an alarm termed the vertical avoidance alarm also called "pull-up". In this case, the dangerous terrain is typically depicted in plain red on the displays of the instrument panel. The pilot absolutely must instigate a vertical avoidance maneuver.

Nevertheless, in certain cases, the alarm associated with a vertical avoidance is replaced by an alarm termed the transverse avoidance alarm also called "avoid terrain". These cases arise when a vertical avoidance trajectory would not make it possible to avoid the collision with the terrain, typically when starting a turn or stopping a turn in mountainous zones. The transverse avoidance must not, in these particular cases, limit itself to a simple maneuver termed a vertical evade but also integrate a transverse component so as to avoid the collision, the maneuver rate being able to be provided by the TAWS system. In this case, the dangerous terrain is typically represented by alternately red and black bands on the displays of the instrument panel. The pilot absolutely must instigate a transverse avoidance maneuver.

This "avoid terrain" alarm is triggered in certain specific situations detailed below:

When the surface or the profile of the terrain situated in the safety surface or profile exceeds locally at one or more points or in one or more sections in a very significant manner the level of said surface or of said safety profile. In this case, a vertical avoidance maneuver may prove to be insufficient to eliminate any risk of collision. This situation can occur when the craft A is at a significantly lower height than the surrounding terrain, for example, when the craft is in the phase of approach to airports P situated in a mountainous zone as at Calvi, at Chambéry, at Katmandu, at Innsbruck, etc. This case is presented in the lateral and top views of FIG. 5 where the future trajectory $T_F$ of the aircraft A is depicted in solid line and the safety surface or profile S is depicted dashed.

When a very wide portion of the surface or of the profile of the terrain enters the safety profile or surface. In this case also, it is not certain that a vertical avoidance maneuver will make it possible to preserve a sufficient vertical safety margin making it possible to avoid the collision. This situation is depicted in FIG. 6.

When the aircraft A changes trajectory rapidly, either by increasing the curvature of its trajectory as indicated in FIG. 7, or by decreasing it as indicated in FIG. 8. In the views of these two figures, the position and the future trajectory $T_F$ of the aircraft A have been indicated at the instants T and T+ΔT. At the instant T, the future trajectory symbolized by an arrow did not foretell any collision with the terrain G. At the instant T+ΔT, a change of trajectory gives rise to a risk of near collision.

When the pilot has not reacted sufficiently quickly to a vertical avoidance alarm.

The transverse avoidance maneuver consists either in carrying out a vertical avoidance maneuver accompanied by a turn with an appropriate radius of deflection, or else in a correction of the last piloting action performed by the pilot to obtain the necessary trajectory correction.

One of the tricky points in the management of "TAWS" systems is to precisely determine the situations in which the transverse avoidance alarm termed "avoid terrain" must be triggered, simple comparison between the medium- and short-term safety surfaces or profiles and the surfaces or terrain profiles possibly proving to be insufficient in the specific situations mentioned above.

Specifically with such a comparison, the height of overshoot of the terrain above the safety surface is not established.

SUMMARY OF THE INVENTION

The invention proposes to consider in addition to the safety surfaces or profiles ordinarily calculated a surface or a profile called the immediate safety surface or profile or else the "Immediate Clearance Sensor" making it possible to discern with greater exactness the type of alarm and maneuver to be performed. Such an invention makes it possible to provide alarms appropriate to the situation and hence to thus decrease in an appreciable manner the risk of collision with the terrain.

More precisely, the invention is aimed at an onboard terrain anticollision device for aircraft comprising at least:
  A memory comprising topographic data of the terrain and/or of the obstacles overflown;
  Information processing means comprising:
    An input for receiving flight parameters;
    First trajectory prediction means for establishing on the basis of said flight parameters at least one first profile or a first safety surface corresponding to a first predicted trajectory;
    First means of topographic calculation for establishing on the basis of said flight parameters at least one first profile or a first topographic surface constituted on the basis of the topographic data of the terrain and/or of the obstacles overflown;
    First comparison means for establishing at least one first comparison between said first profile or said first safety surface and a first profile or a first topographic surface for determining at least one first risk of collision of the aircraft with the ground;
    Second trajectory prediction means for establishing on the basis of the flight parameters a second profile or a second safety surface corresponding to a second predicted trajectory;
    Second calculation means for establishing on the basis of the flight parameters a second profile or a second topographic surface constituted on the basis of the topographic data of the terrain and/or of the obstacles overflown;
    Second comparison means for establishing a second comparison between said second profile or said second safety surface and the second profile or the second topographic surface for determining a second risk of collision of the aircraft with the ground;
  Alarm means linked to said processing means for establishing at least one first state termed the first alarm state as a function of the results of the first comparison and a second state termed the second alarm state as a function of the results of the second comparison, said second state different from the first alarm state.
Advantageously, the device also comprises:
Information processing means comprising:
  Third trajectory prediction means for establishing at least on the basis of the flight parameters a third profile or a third safety surface corresponding to a third predicted trajectory;
  Third means of topographic calculation for establishing at least on the basis of said flight parameters a third profile or a third topographic surface constituted on the basis of the topographic data of the terrain and/or of the obstacles overflown;
  Third comparison means for establishing at least one third comparison between said third profile or said third safety surface and a third profile or a third topographic surface for determining at least one third risk of collision of the aircraft with the ground;
Alarm means linked to said processing means for establishing at least one state termed the prealarm state as a function of the results of the third comparison.

BRIEF DESCRIPTION OF THE DRAWINGS

The invention will be better understood and other advantages will appear on reading the description which will follow given without limitation and by virtue of the appended figures among which.

MORE DETAILED DESCRIPTION

Figure 1:
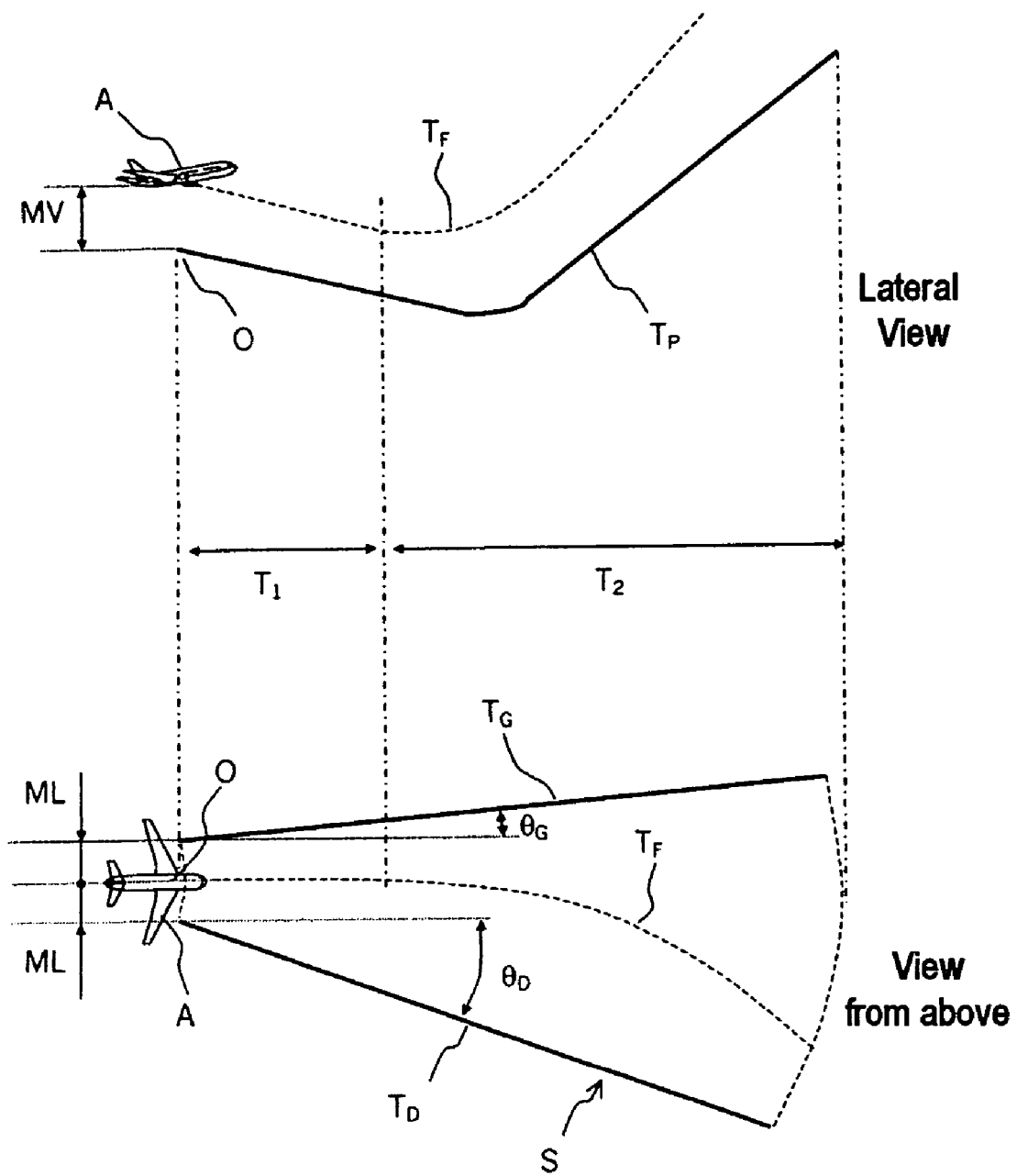
FIG. 1 represents a lateral view and a view from above of the safety surface according to the prior art.
Figure 2:
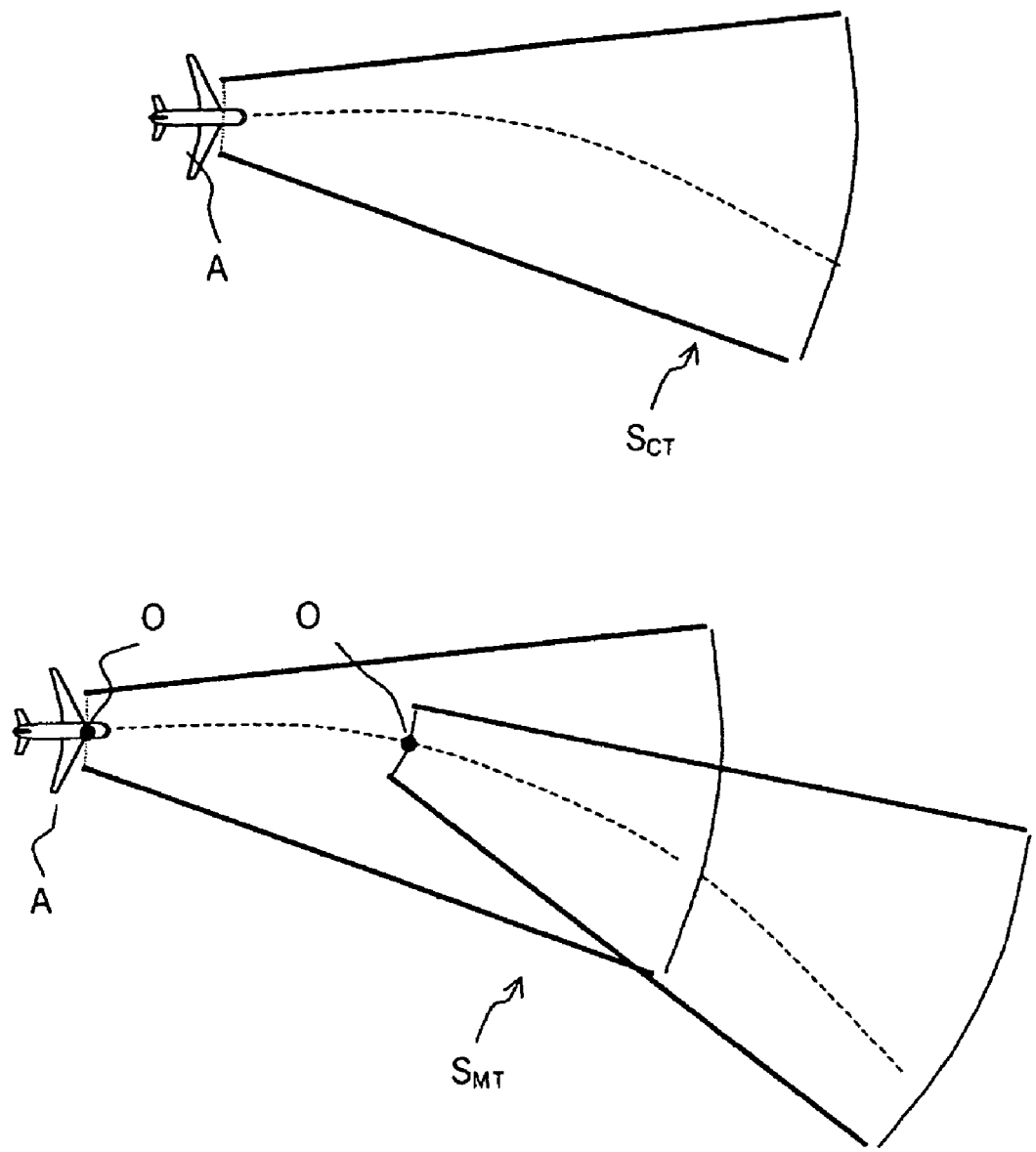
FIG. 2 represents a view from above of a short-term defined safety surface and of a medium-term defined safety surface.
Figure 3:
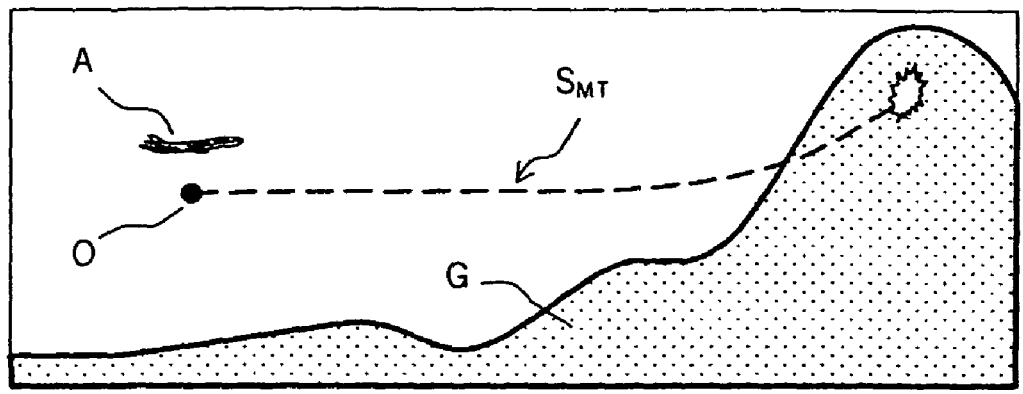
FIG. 3 represents the comparison between the medium-term safety surface and the surface of the terrain.
Figure 4:
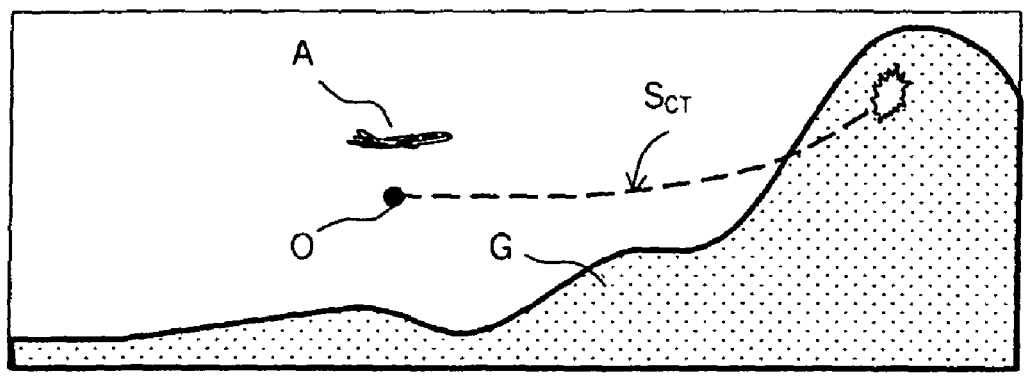
FIG. 4 represents the comparison between the short-term safety surface and the surface of the terrain.
Figure 5:
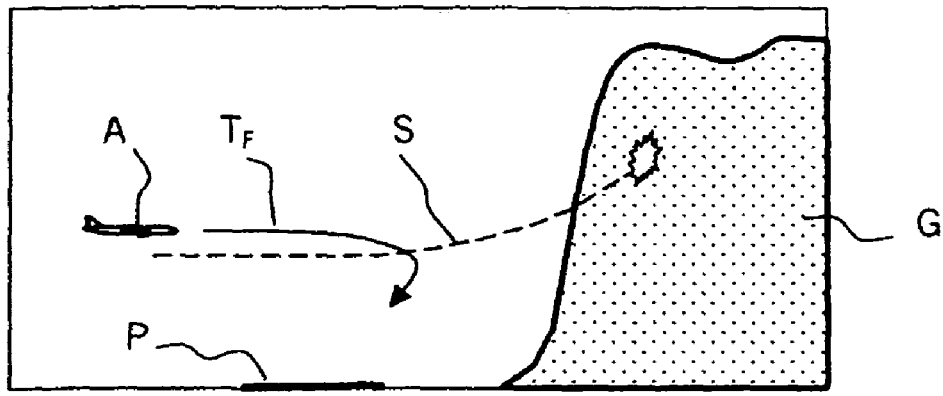
FIG. 5 represents a first situation triggering an alarm and a transverse avoidance maneuver.
Figure 5:
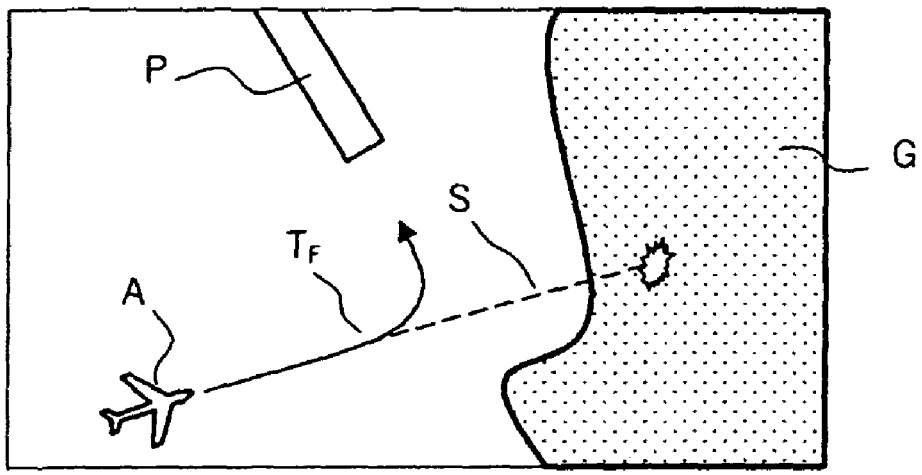
Figure 6:
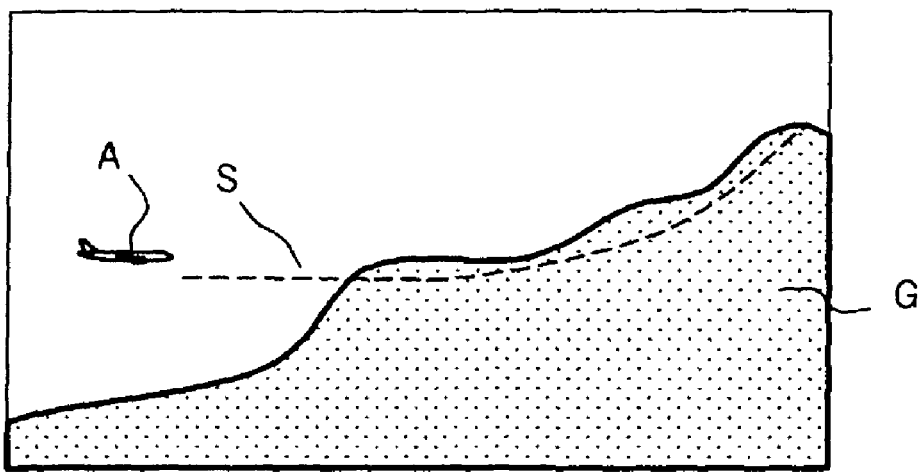
FIG. 6 represents a second situation triggering an alarm and a transverse avoidance maneuver.
Figure 7:
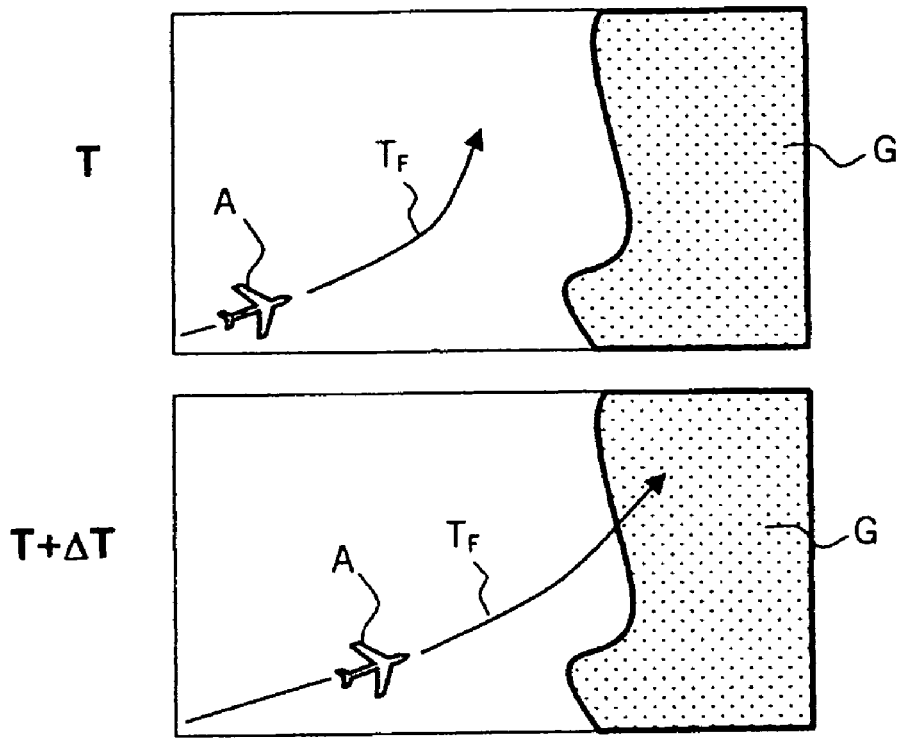
FIG. 7 represents a third situation triggering an alarm and a transverse avoidance maneuver.
Figure 8:
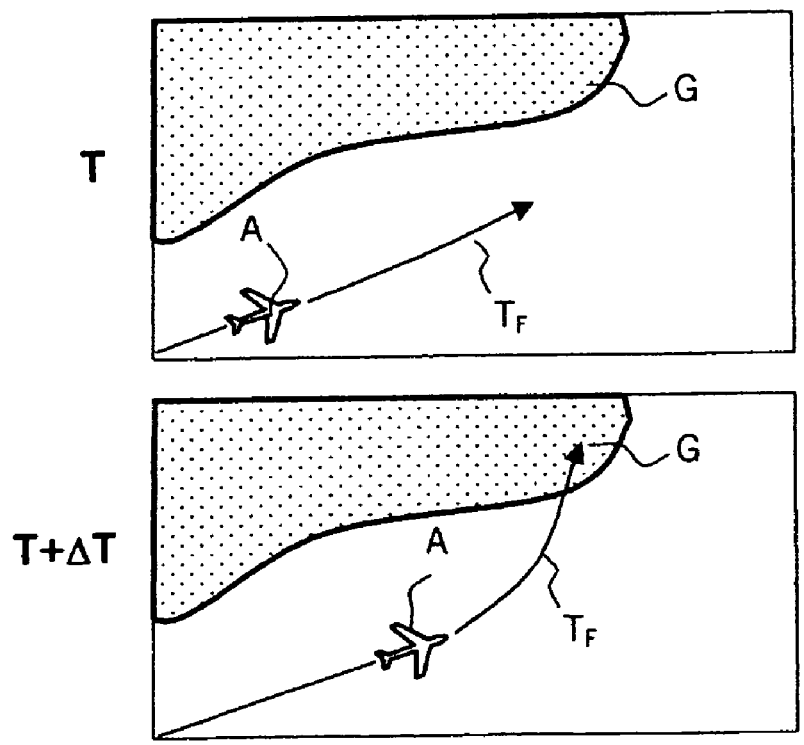
FIG. 8 represents a fourth situation triggering an alarm and a transverse avoidance maneuver.
Figure 9:
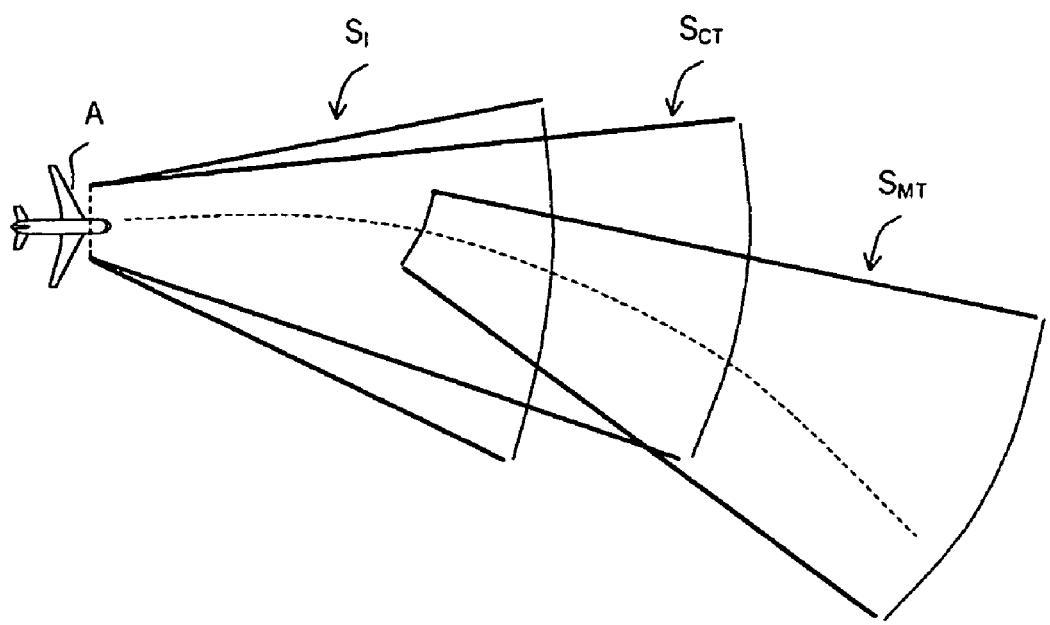
FIG. 9 represents the medium-term safety surface, the short-term safety surface and the immediate safety surface according to the invention.
Figure 10:
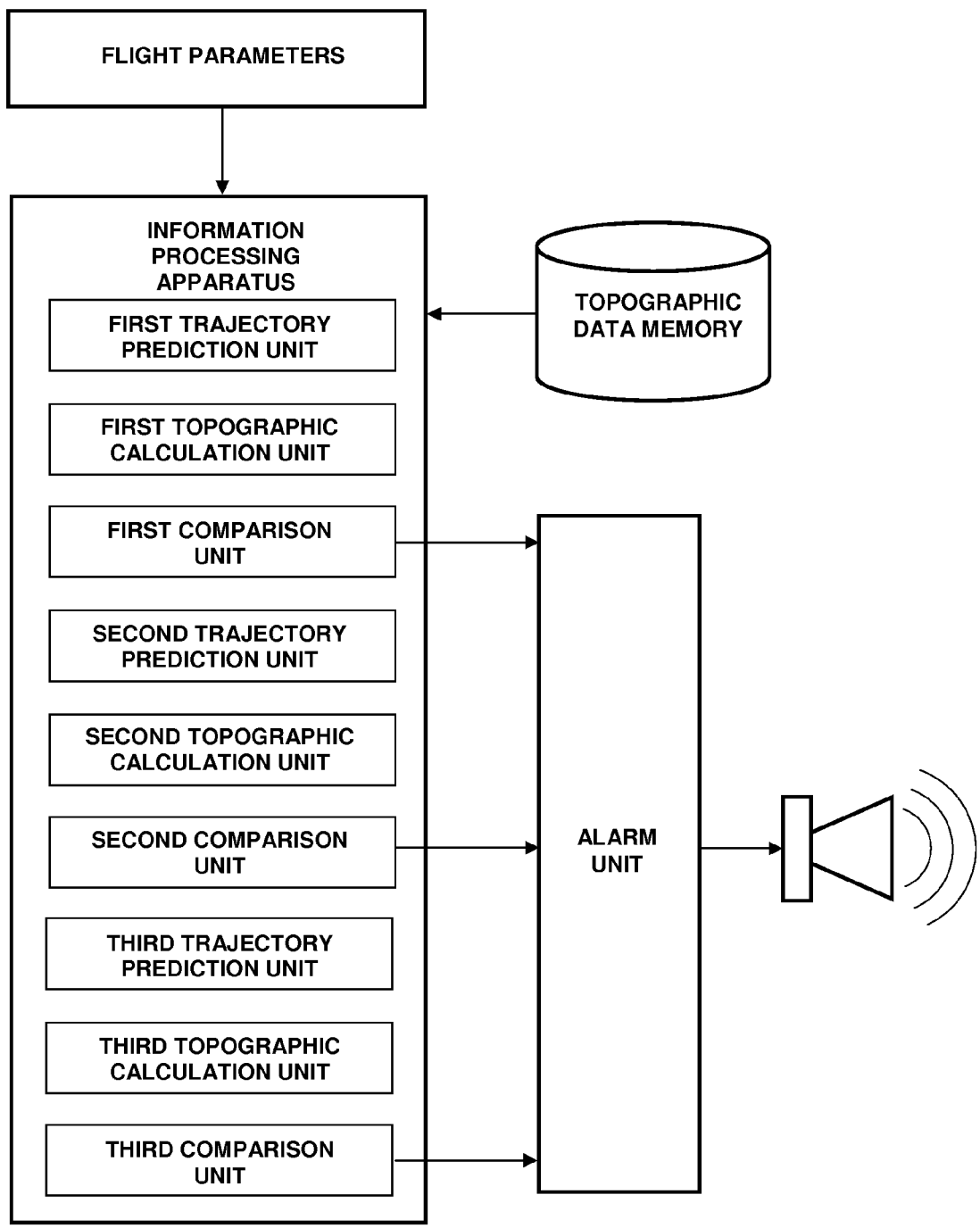
FIG. 10 represents an on-board terrain anticollision device according to an embodiment.
Figure 11:
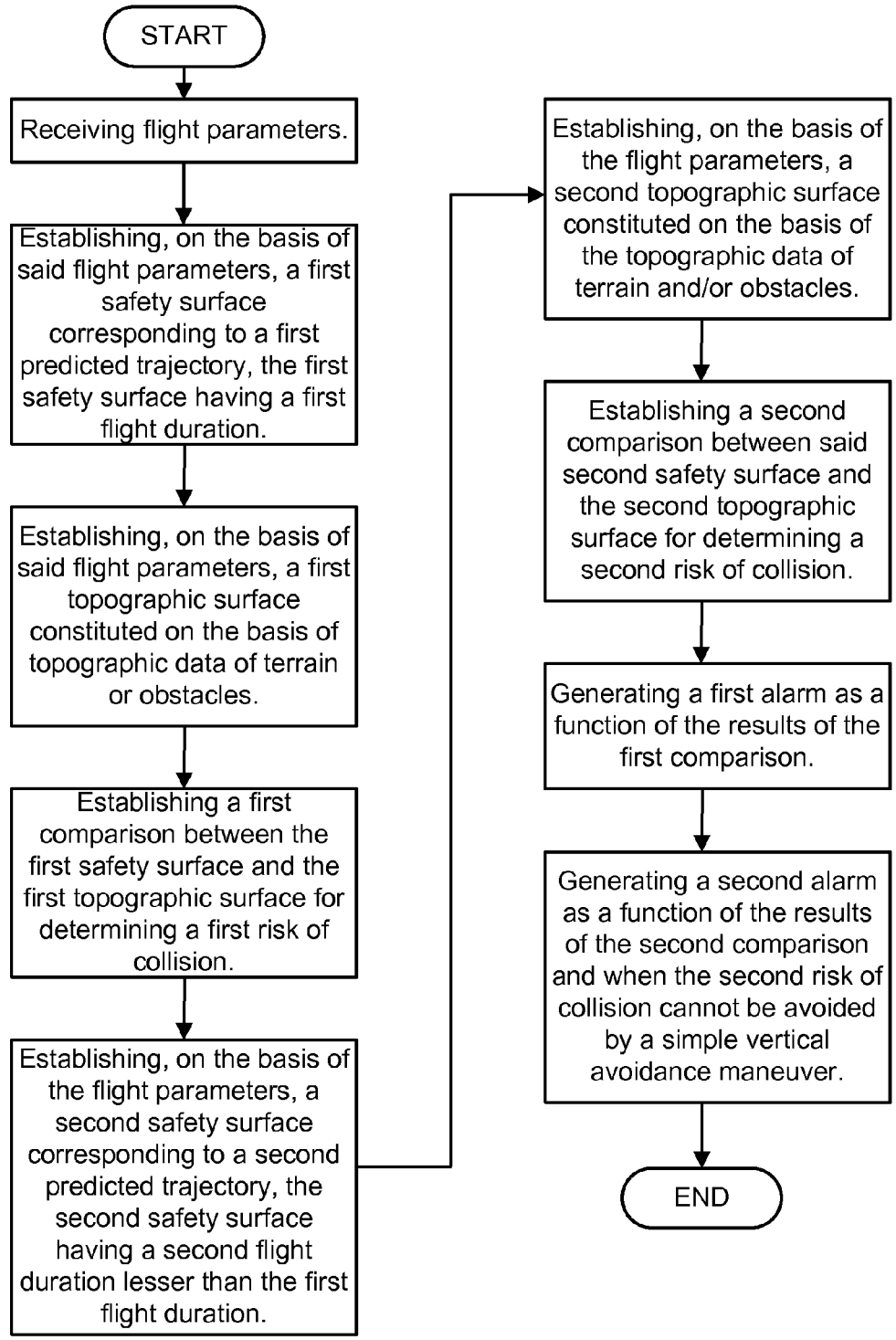
FIG. 11 represents a method of operating an on-board terrain anticollision device according to an embodiment.

Referring to FIGS. 9 through 11, an onboard terrain anticollision device according to an embodiment hence comprises a "CPA" mode generating at least:
  a medium-term safety surface or profile $S_{MT}$ also called the "Medium Term Clearance Sensor"
  and/or a short-term safety surface or profile $S_{CT}$ also called the "Short Term Clearance Sensor"
  and a safety surface or profile termed immediate $S_I$ according to the invention also called the "Immediate Clearance Sensor"

The medium-term safety Surface or Profile $S_{MT}$ is dedicated to the detection of a potential collision with the terrain in the medium term. In the event of risk of collision, a prealarm is emitted in such a way that the pilot takes cognizance of the risk and can anticipate this danger.

The short-term safety surface $S_{CT}$ is dedicated to the detection of a potential collision with the terrain in the short-term. In the event of risk of collision, a first alarm is emitted indicating to the pilot that he must instigate forthwith a vertical avoidance maneuver termed "pull-up".

The safety surface or profile termed immediate $S_I$ is dedicated to the detection of a potential collision with the terrain in the very short term, which collision may not be avoided by a simple vertical avoidance maneuver. In the event of risk of collision, a second alarm is emitted for transverse avoidance termed "avoid terrain", noticeably different from the alarm termed "pull-up". In the majority of cases, the pilot must then instigate either a transverse avoidance maneuver or a cancellation of the trajectory correction having led to this situation.

The calculation of this immediate safety surface or profile makes it possible to discriminate the situations where a "pull-up" maneuver is sufficient for avoiding the collision from the situations where an "avoid terrain" maneuver is imperative for avoiding the collision, this discrimination being ensured neither by first-generation "TAWS" systems, nor in a fully satisfactory manner by second-generation "TAWS" systems.

Consequently, the first alarm is of the vertical avoidance alarm type and the second alarm is of the transverse avoidance alarm type, the vertical avoidance alarm corresponding for the pilot to a vertical avoidance maneuver and the transverse avoidance alarm corresponding for the pilot to a transverse avoidance maneuver.

The medium-term, short-term and immediate safety surfaces or profiles are defined as previously as a function of a predicted trajectory bounded by two lateral limits. Each of the predicted trajectories comprises two parts:
 a first part corresponding to a first flight time, dependent on a prediction of the trajectory in progress calculated on the basis of an origin O taken at the level of the aircraft;
 a second part corresponding to a second flight time $T_1$ following the first flight time, dependent on a prediction of a vertical avoidance trajectory.

The parameters defining the immediate safety surface or profile $S_1$ termed the "Immediate Clearance Sensor" according to the invention can be neighboring or identical with those defining the medium-term and short-term safety surface or profile. To optimize the effectiveness of said immediate safety surface or profile, the lateral margins or the angles of right and left lateral aperture of the limits of said immediate safety surface or profile can also be substantially different from the lateral margins or from the angles of right and left lateral aperture of the limits of the other predicted surfaces. To improve the effectiveness of the system according to the invention, at least one of the first comparison means or second comparison means (the first comparison unit or the second comparison unit) can advantageously comprise a criticality indicator of the risk of collision with the terrain. Said criticality indicator can depend on the surface or on the terrain profile situated above one of the safety surfaces or profile. It can also depend on the terrain surface and on the terrain height situated above one of the safety surfaces.

The first flight time for the medium-term safety surfaces or profiles has a duration of about 20, the first flight time for the short-term safety surface or profile has a duration of about 8 seconds and the first flight time for the immediate safety surface or profile has a low duration, typically less than 3 seconds.

The first, the second and the third safety surface or profiles are bounded laterally by a left limit and a right limit, said limits being defined essentially by a lateral margin and at least one angle of left lateral aperture and at least one angle of right lateral aperture.

The parameters defining the immediate safety surface or profile $S_I$ termed the "Immediate Clearance Sensor" according to the invention can be neighboring or identical with those defining the medium-term and short-term safety surface or profile. To optimize the effectiveness of said immediate safety surface or profile, the lateral margins or the angles of right and left lateral aperture of the limits of said immediate safety surface or profile can also be substantially different from the lateral margins or from the angles of right and left lateral aperture of the limits of the other predicted surfaces. To improve the effectiveness of the system according to the invention, at least one of the first comparison means or second comparison means can advantageously comprise a criticality indicator of the risk of collision with the terrain. Said criticality indicator can depend on the surface or on the terrain profile situated above one of the safety surfaces or profile. It can also depend on the terrain surface and on the terrain height situated above one of the safety surfaces.

The alarms are of audible or visual type. They can be indicated in the latter case on the displays of the instrument panel of the aircraft.

Advantageously, the information processing means (the information processing apparatus) can comprise means of alarm management (alarm management unit) as a function of the evolution of the risks of collision with the terrain.

The device then comprises means for switching the transverse avoidance and vertical avoidance alarms, when the situation of the aircraft evolves. Specifically, the alarms provided by devices of this type are typically maintained so long as the situation of danger of collision is not resolved.

In order to avoid unscheduled switchings, such a switching can typically be performed when the situation of the aircraft has changed in a significant manner and the trajectory has evolved noticeably, for example by a change of the slope or of the roll or of the heading of more than a few degrees, typically from 2 to 10 degrees.

The invention claimed is:
1. An onboard terrain anticollision device for an aircraft, comprising:
 a memory including topographic data of the terrain and/or of the obstacles overflown; and
 an information processing apparatus comprising:
  an input configured to receive flight parameters;
  a first trajectory prediction unit configured to establish, on the basis of said flight parameters, at least a first safety surface corresponding to a first predicted trajectory, the first safety surface having a first flight duration and being bounded laterally by a first left limit and a first right limit, said first right and left limits being defined essentially by a first lateral margin and at least a first angle of left lateral aperture and at least a first angle of right lateral aperture;
  a first topographic calculation unit configured to establish, on the basis of said flight parameters, at least a first topographic surface constituted on the basis of the topographic data of the terrain and/or of the obstacles overflown;
  a first comparison unit configured to compare said first safety surface and the first topographic surface for determining at least one first risk of collision of the aircraft with the ground corresponding to the first flight duration;
  a second trajectory prediction unit configured to establish, on the basis of the flight parameters, a second safety surface corresponding to a second predicted trajectory, the second safety surface having a second flight duration lesser than the first flight duration and being bounded laterally by a second left limit and a second right limit, said second right and left limits being defined essentially by a second lateral margin and at least a second angle of left lateral aperture and at least a second angle of right lateral aperture;
  a second calculation unit configured to establish, on the basis of the flight parameters, a second topographic surface constituted on the basis of the topographic data of the terrain and/or of the obstacles overflown;

a second comparison unit configured to compare said second safety surface and the second topographic surface for determining a second risk of collision of the aircraft with the ground corresponding to the second flight duration;

a third trajectory prediction unit configured to establish, at least on the basis of the flight parameters, a third safety surface corresponding to a third predicted trajectory, the third safety surface having a third flight duration greater than the first flight duration and being bounded laterally by a third left limit and a third right limit, said third right and left limits being defined essentially by a third lateral margin and at least a third angle of left lateral aperture and at least a third angle of right lateral aperture;

a third topographic calculation unit configured to establish, at least on the basis of said flight parameters, a third topographic surface constituted on the basis of the topographic data of the terrain and/or of the obstacles overflown;

a third comparison unit configured to compare said third safety surface and the third topographic surface for determining at least one third risk of collision of the aircraft with the ground corresponding to the third flight duration; and an alarm unit linked to said information processing apparatus and configured to generate:

a first alarm being a vertical avoidance alarm when the first risk of collision is avoidable by a simple vertical avoidance maneuver;

a second alarm being a traverse avoidance alarm when the second risk of collision is not avoidable by a simple vertical avoidance maneuver; and a prealarm for indicating a potential collision according to the determined third risk of collision.

2. The onboard terrain anticollision device as claimed in claim 1, wherein the second flight duration has a duration of less than 3 seconds.

3. The onboard terrain anticollision device as claimed in claim 2, wherein the first flight duration is no greater than 8 seconds.

4. The onboard terrain anticollision device as claimed in claim 1, wherein the first alarm is of the vertical avoidance alarm type and the second alarm is of the transverse avoidance alarm type, the vertical avoidance alarm corresponding for the pilot to a vertical avoidance maneuver and the transverse avoidance alarm corresponding for the pilot to a transverse avoidance maneuver.

5. The onboard terrain anticollision device as claimed in claim 1, wherein the first or the second safety surface comprises two parts:

a first part corresponding to a first flight time ($T_1$), dependent on a prediction of the trajectory in progress calculated on the basis of an origin (O) taken under the aircraft; and a second part corresponding to a second flight time ($T_2$) following the first flight time, dependent on a prediction of a vertical avoidance trajectory.

6. The onboard terrain anticollision device as claimed in claim 5, wherein the parameters defining the first part or the second part of the second safety surface can be substantially different from the parameters defining those of the first safety surface.

7. The onboard terrain anticollision device as claimed in claim 1, wherein the first lateral margins or the first angles of right and left lateral aperture are substantially different from the second lateral margins or from the second angles of right and left lateral aperture of the limits.

8. The onboard terrain anticollision device as claimed in claim 1, wherein at least one of the first comparison unit or second comparison unit comprise a criticality indicator of the risk of collision with the terrain.

9. The onboard terrain anticollision device as claimed in claim 8, wherein the criticality indicator depends on the first or the second topographic surface situated above the first or the second safety surface.

10. The onboard terrain anticollision device as claimed in claim 8, wherein the criticality indicator depends on the first or the second topographic surface and a terrain height situated above the first or the second safety surface.

11. The onboard terrain anticollision device as claimed in claim 1, wherein the alarms are of audible or visual type.

12. The onboard terrain anticollision device as claimed in claim 1, wherein the information processing apparatus further comprise an alarm management unit configured as a function of the evolution of the risks of collision with the terrain.

13. The onboard terrain anticollision device as claimed in claim 12, wherein the alarm management unit comprises a device configured to switch the first and the second alarms.

14. The onboard terrain anticollision device as claimed in claim 13, wherein the switching is performed when the trajectory of the aircraft has evolved noticeably.

15. The onboard terrain anticollision device as claimed in claim 13, wherein the evolution of the trajectory of the aircraft is a change of the slope or of the roll or of the heading of more than a few degrees.

16. The onboard terrain anticollision device as claimed in claim 1, wherein the first flight duration is no greater than 8 seconds, the second flight duration is no greater than 3 seconds, and the third flight duration is no greater than 20 seconds.

17. A method of operating an onboard terrain anticollision device for an aircraft, comprising:

receiving flight parameters;

establishing, on the basis of said flight parameters, a first safety surface corresponding to a first predicted trajectory, the first safety surface having a first flight duration;

establishing a first topographic surface according to the flight parameters and the topographic data of terrain or obstacles;

comparing the first safety surface and the first topographic surface for determining a first risk of collision;

establishing, on the basis of the flight parameters, a second safety surface corresponding to a second predicted trajectory, the second safety surface having a second flight duration lesser than the first flight duration;

establishing a second topographic surface according to the flight parameters and the topographic data of terrain or obstacles;

comparing said second safety surface and the second topographic surface for determining a second risk of collision;

establishing, on the basis of said flight parameters, a third safety surface corresponding to a third predicted trajectory, the third safety surface having a third flight duration greater than the first flight duration;

establishing a third topographic surface according to the flight parameters and the topographic data of terrain or obstacles;

comparing the third safety surface and the third topographic surface for determining a third risk of collision;

generating a first alarm being a vertical avoidance alarm when the first risk of collision is avoidable by a simple vertical avoidance maneuver;

generating a second alarm being a traverse avoidance alarm when the second risk of collision is not avoidable by a simple vertical avoidance maneuver; and generating a third alarm for indicating a potential collision according to the determined third risk of collision.

18. The method of claim 17, wherein the first flight duration is no greater than 8 seconds, the second flight duration is no greater than 3 seconds, and the third flight duration is no greater than 20 seconds.

\* \* \* \* \*